(12) United States Patent
Cassanova et al.

(10) Patent No.: US 8,218,746 B2
(45) Date of Patent: *Jul. 10, 2012

(54) SYSTEMS, METHODS AND COMPUTER PRODUCTS FOR CALLER IDENTIFICATION FROM CALL TO WIRELESS/WIRELINE CELLULAR TO INTERNET PROTOCOL TELEVISION

(75) Inventors: Jeffrey Cassanova, Villa Rica, GA (US); N. Peter Hill, Atlanta, GA (US); David DeLorme, Stone Mountain, GA (US); Li Zhang, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1103 days.

This patent is subject to a terminal disclaimer.

(21) Appl. No.: 12/035,450

(22) Filed: Feb. 22, 2008

(65) Prior Publication Data

US 2009/0214013 A1 Aug. 27, 2009

(51) Int. Cl.
*H04M 1/56* (2006.01)
*H04M 15/06* (2006.01)
*H04M 3/42* (2006.01)

(52) U.S. Cl. ............... 379/142.07; 379/142.16; 455/415

(58) Field of Classification Search ............... 379/88.13, 379/77.17, 88.19, 93.23, 102.03, 142.01, 379/142.07, 142.13, 142.16; 455/415, 435.2, 455/556.1, 557; 370/351, 352

See application file for complete search history.

(56) References Cited

U.S. PATENT DOCUMENTS

| | | | |
|---|---|---|---|
| 6,343,220 B1 * | 1/2002 | Van Der Salm | 455/552.1 |
| 7,499,704 B1 * | 3/2009 | Bonner | 455/435.1 |
| 2006/0115062 A1 * | 6/2006 | Gonder et al. | 379/142.01 |
| 2006/0262913 A1 * | 11/2006 | Cook et al. | 379/88.19 |
| 2006/0286984 A1 * | 12/2006 | Bonner | 455/445 |
| 2007/0206748 A1 * | 9/2007 | Cassanova et al. | 379/142.01 |

\* cited by examiner

*Primary Examiner* — Quoc D Tran
(74) *Attorney, Agent, or Firm* — Cantor Colburn LLP

(57) ABSTRACT

Systems, methods and computer products for providing caller identification from a call to a wireless/wireline cellular phone to Internet Protocol Television. Exemplary embodiments include a method for providing caller identification services to an Internet Protocol-enabled device, including receiving a communication request from a caller device over a voice network, the communication request including a caller party number of the caller device and a called patty number of a dual-mode called device associated with the communication request, mapping the called party number to an Internet Protocol-enabled device address of a called party and sending the caller party number to the Internet Protocol-enabled device address corresponding to the called party number.

20 Claims, 5 Drawing Sheets

SYSTEMS, METHODS AND COMPUTER PRODUCTS FOR CALLER IDENTIFICATION FROM CALL TO WIRELESS/WIRELINE CELLULAR TO INTERNET PROTOCOL TELEVISION

CROSS-REFERENCE TO RELATED APPLICATIONS

This application is related to commonly assigned U.S. patent application Ser. No. 11/780,728, entitled SYSTEMS, METHODS AND COMPUTER PRODUCTS FOR VOICEMAIL VIA INTERNET PROTOCOL TELEVISION, filed on Jul. 20, 2007. This application is related to commonly assigned U.S. patent application Ser. No. 11/780,746, entitled SYSTEMS, METHODS AND COMPUTER PRODUCTS FOR PLACING TELEPHONE CALLS VIA INTERNET PROTOCOL TELEVISION CALL LOGS, filed on Jul. 20, 2007. This application is also related to commonly assigned U.S. patent application Ser. No. 11/780,760, entitled SYSTEMS, METHODS AND COMPUTER PRODUCTS FOR LOGGING OF INCOMING CALLS TO AN INTERNET PROTOCOL TELEVISION CALL LOG, filed on Jul. 20, 2007. This application is also related to commonly assigned U.S. patent application Ser. No. 11/780,748, entitled SYSTEMS, METHODS AND COMPUTER PRODUCTS FOR LOGGING OF OUTGOING CALLS TO AN INTERNET PROTOCOL TELEVISION CALL LOG, filed on Jul. 20, 2007. This application is also related to commonly assigned U.S. patent application Ser. No. 11/780,788, entitled SYSTEMS, METHODS AND COMPUTER PRODUCTS FOR INTERNET PROTOCOL TELEVISION MESSAGE WAITING INDICATION, filed on Jul. 20, 2007. This application is also related to commonly assigned U.S. patent application Ser. No. 11/780,770, entitled SYSTEMS, METHODS AND COMPUTER PRODUCTS FOR INTERNET PROTOCOL TELEVISION VOICEMAIL MONITORING, filed on Jul. 20, 2007. Each of the above applications is incorporated by reference herein in its entirety.

BACKGROUND

The present invention relates generally to telecommunications, and more particularly, to systems, methods and computer products for caller identification from call to wireless/wireline cellular to Internet Protocol Television.

Contemporary cable and satellite television systems generally utilize a set-top box on the subscriber's premises. Sometimes limited set-top box functionality is built into the television, but the set-top box and the television are generally separate devices. The set-top box performs authentication, authorization, and accounting functions. However, a primary function of the set-top box (at least from the customer's viewpoint) is channel selection, including presenting the list of channels available to the customer. This list is often referred to as the electronic programming guide (EPG). Furthermore, Internet Protocol Television (IPTV) utilizes set-top boxes to decode programming delivered over the IP network. This additional power can also be leveraged to provide more flexible services to customers. IPTV set top boxes are being designed to allow functions such as access to Internet content (weather, maps, video, music), and access to local, video content (e.g., viewing the security camera at the apartment from gate or pool area).

While contemporary cable and satellite television systems offer limited phone services such as voice over Internet Protocol (VOIP), for subscribers who use conventional telephony telecommunications networks such as via public switched telephone network (PSTN) networks, global system for mobile communications (GSM) networks, and dual phone networks, phone interaction with the set top box and the television is limited if not non-existent. For example, a subscriber can place a phone call to enable the set top box to present a pay-per-view program to the attached television. Currently, there are no call management features (e.g., caller identification, voicemail services, call logging, etc.) available for interaction between PSTN and IPTV systems.

It is therefore desirable to provide a means for providing call management services and capabilities to IPTV devices where the called device is supported by a telephony network.

BRIEF SUMMARY

Exemplary embodiments include a method for providing caller identification services to an Internet Protocol-enabled device, including receiving a communication request from a caller device over a voice network, the communication request including a caller party number of the caller device and a called party number of a dual-mode called device associated with the communication request, mapping the called party number to an Internet Protocol-enabled device address of a called party and sending the caller party number to the Internet Protocol-enabled device address corresponding to the called party number.

Additional exemplary embodiments include a system for providing caller identification services to an Internet Protocol-enabled device, including a computer processing device and a caller identification services application executing on the computer processing device, the caller identification services application performing a method, including receiving a communication request from a caller device over a voice network, the communication request including a caller party number of the caller device and a called party number of a dual-mode called device associated with the communication request, mapping the called party number to an Internet Protocol-enabled device address of a called party and sending the caller party number to the Internet Protocol-enabled device address corresponding to the called party number.

Further exemplary embodiments include a computer program product for providing caller identification services to an Internet Protocol-enabled device, the computer program product including instructions for causing a computer to implement a method, the method including receiving a communication request from a caller device over a voice network, the communication request including a caller party number of the caller device and a called party number of a dual-mode called device associated with the communication request, mapping the called party number to an Internet Protocol-enabled device address of a called party and sending the caller party number to the Internet Protocol-enabled device address corresponding to the called party number.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include Internet Protocol Television (IPTV) systems that interlace with telecommunications networks, thereby providing an IPTV call management system. In exemplary embodiments, a method for providing caller identification services for a call to a wireless/wireline cell phone and having the caller id information display on an IPTV enabled set top box. In exemplary embodiments, voicemail can be accessed and managed via IPTV. In other exemplary embodiments, phone calls can be placed or returned from an IPTV call log accessible through an IPTV communications device, such as a set top box and television. In other exemplary embodiments, both incoming and outgoing calls can be logged into the above-mentioned call log. In other exemplary embodiments, voicemail, as described above, can be monitored during reception of the voicemail. In exemplary embodiments, various message formats that can be received in an IPTV system provide a message waiting indication on the communications device.

Figure 1A:
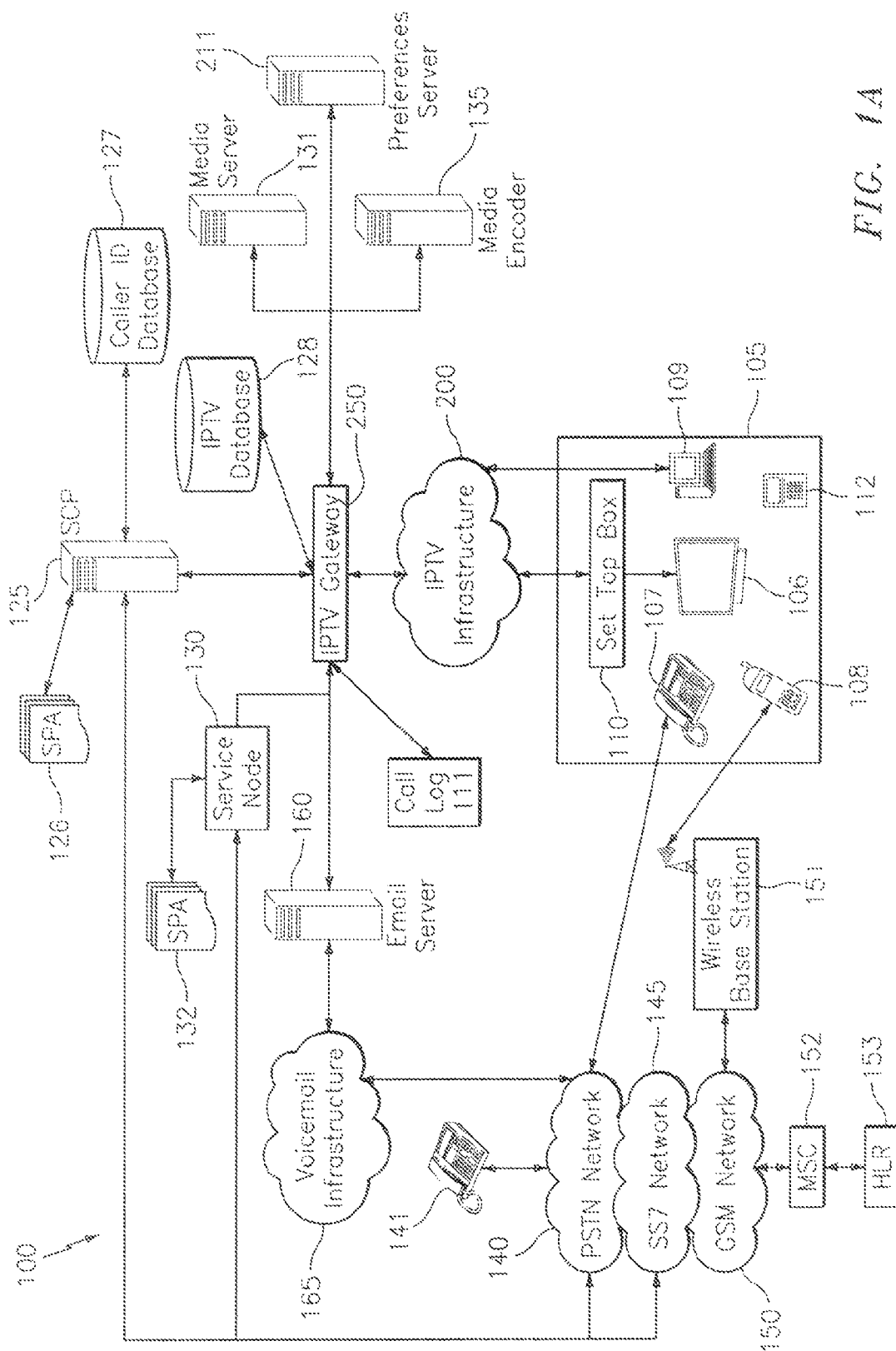
FIG. 1A illustrates a block diagram of an exemplary IPTV call management system.

Turning now to FIG. 1A, a block diagram of an exemplary IPTV call management system 100, which implements call management via IPTV services in accordance with exemplary embodiments, is now described.

For ease of illustration, the system of FIG. 1A depicts a simplified network infrastructure. It is understood that a variety of network components/nodes may be utilized in implementing the embodiments described herein. For example, in exemplary embodiments, system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 106 (e.g., an IPTV-enabled television) coupled to a set top box 110, subscriber call devices 107, 108, 113 and a subscriber computer 109. The accounts may thus include phone, network access and IPTV services and may be used to provide access to the call management services as described further herein. Furthermore, in exemplary embodiments, one of the devices can be provisioned for the network services described herein by associating a device identifier of the communications device with a respective account. The account, in turn, identifies each of the communications devices belonging to the community and provides other information as described herein.

It is appreciated to those skilled in the art that the networks discussed above may include circuit-switched and/or packet-switched technologies and devices, such as routers, switches, hubs, etc., for facilitating communications between various types of communications devices such as communications device 106, a wireline phone 107, a cellular phone 108, a WiFi/cellular (dual mode) telephone 113a, 113b, the subscriber computer 109, etc. The wireless/wireline telephone 113 may include wireline and/or wireless components milking, e.g., 802.11 standards for providing over-the-air transmissions of communications, as described further below. As further described herein, the WiFi/cellular telephone has a cellular and non-cellular mode. For illustrative purposes, the WiFi/cellular phone 113a, 113b, is shown as two devices when in the two different modes. For example, when in a GSM (cellular mode) the discussion refers to phone 113a, and when in a non-cellular mode (e.g., 802.11), the discussion refers to phone 113b. For ease of discussion, the Wi-Fi/cellular telephone 113a, 113b is collectively discussed as subscriber call device 113.

As discussed above, the system 100 of FIG. 1A includes a subscriber location 105, such as the subscriber's household. The subscriber location 105 can include the communications device 106 (e.g., an IPTV-enabled television, etc.) in communication with the set top box 110. The set top box 110 can have access to a call log 111 into which calls made to and from subscriber call devices 107, 108, 113 can be logged and communicated to the set top box 110, which are implemented as part of the converged services described herein. In exemplary embodiments, the call log 111 resides on the IPTV gateway 250 and can reside on the set top box 110. The subscriber location 105 can further include a remote control 112 for control and navigation of the communications device 106. The subscriber location 105 can further include subscriber call devices 107, 108, 113. Subscriber call device 107 is illustrated as a wireline telephone associated with an account that also services the communications device 105 (e.g., both devices are within the community of a single account or household and may be co-located at a single customer premises (i.e., subscriber location 105)). Subscriber call device 108 is illustrated as a cellular telephone associated with the account that also services the communications device 105, and subscriber call device 107. Subscriber call device 113 is illustrated as a dual mode telephone. It is appreciated that several other subscriber call devices are possible including but not limited a SIP telephone, personal digital assistant (PDA), or other type of communications device, and that subscriber call devices 107, 108, 113 are shown and discussed for illustrative purposes. The subscriber location 105 can further include the subscriber computer 109 for communication with networks such as the Internet (not shown) and the IPTV infrastructure 200 (discussed below).

The system 100 can implement converged services such that calls made and received by the subscriber can be managed through the subscriber's IPTV-enabled device, such as communications device 106, via set top box 110. As such, the system 100 may further include the IPTV infrastructure 200 in communication with an IPTV gateway 250 (discussed further with respect to FIG. 2 below). In exemplary embodiments, the IPTV infrastructure 200 can be an IP-based network that receives network data (e.g., call information) front a controller server 125, and delivers the call information to set top box 110 for display or other rendering on the communications device 106. The IPTV gateway 250 is in communication with the controller server 125 (e.g., service control point (SCP) server or application server). The controller server 125 may also communicate with other networks as discussed further in the description below, for example. One or more service package applications (SPAs) 126 reside on the controller server 125 and are implemented for the converged services as described further below. The SPA applications 126 can implement several of the converged services, described herein, such as those that involve call processing. For example, the SPA applications 126 can implement caller identification, voicemail monitoring, outgoing call logging, etc. In exemplary embodiments, the SPA applications 126 handle communication to and from the IPTV gateway 150, as described herein. The SPA application 126 can be a program having logic, data structures, etc. for call processing.

In exemplary embodiments, the system 100 can further include one or more service nodes 130. The service nodes 130 can place and bridge multiple calls to implement the converged services described herein. As such the service nodes 130 are in communication with a public switched telephone network (PSTN) 140. The PSTN 140 may include central office switches (not shown), which in turn may include service switching point (SSP) functionality (not shown). The switches originate and/or terminate calls and communicate over a signaling system 7 (SS7) network 145 with the controller system 125 and the caller identification name database 127 to determine how to route a call, or set up and manage a call feature such as the converged services. It is appreciated that the controller server 125 and the service nodes 130 can be part of an advanced intelligent network (AIN). The service nodes 130 can include additional SPA applications 132, which can be implemented to handle call services such as placing and bridging phone calls. For example, the SPA applications 132 can implement voicemail via IPTV services, call return via an IPTV call log service, voicemail monitoring services, etc. The SPA applications 132 may be initiated as a result of termination attempt triggering events, off hook delay trigger events, etc., as described herein.

In exemplary embodiments, the controller server 125 is in further communication with a caller identification database (e.g., CNAM database) 127 and an IPTV database 128. The caller identification database 127 may include a table of telephony subscriber information (e.g., subscriber names and numbers) and is configured to map the names to the caller party numbers received at the controller server 125 upon a request from the controller server, or other component of the system 100. In exemplary embodiments, the IPTV database 128 contains IPTV addresses for IPTV-enabled communications devices (e.g., communications device 106), each of which are mapped to another communications device address (e.g., telephone number assigned to a user of the subscriber call devices 107, 108, 113). The addresses for these devices are mapped to one another, such that caller identification information for a call that is directed to a first communications device via a voice network (e.g., the subscriber call devices 107, 108, 113) is transmitted to, and presented on, an IPTV-enabled communications device (e.g., communications device 106) over a data network (e.g., IPTV infrastructure 200). As discussed above, the controller server 125 executes the SPA application 126 for implementing such converged services. The SPA application 126 may be initiated as a result of termination attempt triggering events, off hook delay trigger events, or similar events generated by a cellular call or a WiFi call, etc., as described herein.

Referring still to FIG. 1A, the IPTV gateway 250 is in further communication with a media server 131 that provides media resources used in exemplary implementations of the converged services. For example, as discussed further below, the media server 131 can be implemented to coordinate voicemail translations from a .wav format to a .wma format via a media encoder 135, which is also in communication with the IPTV gateway 250.

In exemplary embodiments, the controller server 125 is implemented to coordinate translation and call data from the SS7 network 145, which provides call connection control. The SS7 network 145 may include various network elements, such as signal transfer points (STPs) (not shown), packet switches for routing call signaling traffic through the system 100. The SS7 network 145 may transmit the call signals via reserved channels, or signaling links, that connect central offices (not shown) of the PSTN 140 and other network elements.

In further exemplary embodiments, a global system for mobile communications (GSM) network 150 or other mobile communications network can be in communication with the SS7 network 145 for implementing wireless communications via a wireless base station/cell tower 151 to subscriber call device 108. Those skilled in the art also appreciate that the GSM network 150 is in further communication with a mobile switching center (MSC) 152, which is responsible for routing incoming and outgoing calls within its own network or to and from a wireline network, (e.g., PSTN 140) or to and from other wireless networks. The MSC 152 queries a home location register (HLR) 153, which provides the administrative information required to authenticate, register and locale the subscriber call devices 108, 113. In exemplary embodiments, the caller and/or the called party, such as via WiFi/cellular subscriber call device 113 may be served by an IMS-based telecommunications network that is capable of responding to triggering events, and is in communication with the caller identification database 127 by SS7 or IP connectivity, as discussed further herein.

Therefore, the subscriber call device 107 can be in communication with the PSTN 140, which cars further be in communication with an external call device 141. Furthermore, the subscriber call device 108 (which can include a subscriber identity module (SIM) card) can be in communication with the wireless base station/cellular tower 151, and thus in communication with the external call device 141 via the GSM network 150, the SS7 network 145 and PSTN 140. The external calling device 141 is understood to be a phone or other device used to make and receive calls that is used to communicate with the call devices such as subscriber call devices 107, 108, associated with subscriber location 105, such that call management service can be implemented with respect to calls made and received to subscriber location 105. Therefore, it is appreciated that there may be several triggers that, upon detection, trigger the SPA application 126 to process the incoming or outgoing call signal and implement by the call management services as described herein. For simplicity of discussion, the subscriber call device 108, a wireline device is described herein and is further described as being in communication with external call device 141, which is considered a wireline device for further simplicity of discussion. It is understood and appreciated that external call device can be other call devices including but not limited a cellular phone, a SIP telephone, dual-mode mobile telephone, personal digital assistant (PDA), or other type of communications device.

In exemplary embodiments, an incoming call from an external call device to the subscriber call device 108 (communications request) proceeds through the PSTN 140, the SS7 network 145, and on to the GSM network 150. The communication request is routed by the GSM 150 to the MSC 152, which is responsible for routing incoming and outgoing calls within its own network or to and from a wireline network (e.g., the PSTN 140, etc.) or to and from other wireless networks.

The MSC 152 queries the HLR 153, which provides the administrative information required to authenticate, register and locate the called subscriber call device 108. Once authenticated, registered, and located, the MSC 152 transmits the communications request to controller server 125. This communications request may result from, e.g., a Wireless Intelligent Network (WIN) trigger, a Customized Applications for Mobile Network Enhanced Logic (CAMEL) trigger, or other triggering event such as used in an IMS-based network, which is discussed further below. The caller identification services application 126 authorizes the communication via a message transmitted back to the MSC 152 whereby the MSC 152 terminates the call via the GSM network 150 and a wireless base station 151. At the same time the call is being delivered, the caller identification services application 126 sends the caller id information to the IPTV Gateway 250, which searches caller identification database 127 for caller party identification information (e.g., caller name). The caller identification services application 126 searches the IPTV database 128 for the called party number, which may be used to map communications address information for devices, such as communications devices 106 (and set top box 110, etc.). An IPTV address mapped to the called party number is retrieved and the caller party identification information is transmitted over a data network (e.g., the IPTV infrastructure 200, etc.) to the IPTV-enabled communications device assigned to the IPTV address (e.g., the communications device 106).

In exemplary embodiments, subscriber call device 113 is a WiFi/cellular (dual mode phone). As such, subscriber call device 113 can be a mobile phone containing both cellular (e.g., via the GSM network 150, or other wide area cellular network) and non-cellular modes used for voice and data communication. When in a non-cellular mode, such as when the subscriber call device is within range of the subscriber location 105, the subscriber call device 113 can be in communication with an IP multimedia subsystem telecommunications network (IMS) 190 that is capable of responding to triggering events, and is in communication with the caller identification database 127 by SS7 or IP connectivity. In exemplary embodiments, the SS7 network 145 is in communication with the IMS 190. The IMS 190 is further in communication with a parlay gateway 195, which performs protocol conversions, generic messaging and accesses necessary network services as described herein. The parlay gateway 195 is in communication with the controller server 125. In exemplary embodiments, when the subscriber call device 113 is in non-cellular mode, it can implement a cordless technology such as IEEE 802.11 (WiFi) for communication with the IMS 190.

In exemplary embodiments, an incoming call from an external call device 141 to the subscriber call device 113 (communications request) proceeds through the PSTN 140, the SS7 network 145, and if the mode of the subscriber call device 113 is in a cellular mode, onto the GSM network 150, as described above. If the subscriber call device 113 is in non-cellular mode, then an incoming call from an external call device 141 to the subscriber call device 113 (communications request) proceeds through the PSTN 140, the SS7 network 145, then routed to the IMS 190. The IMS 190 communicates a termination attempt to the parlay gateway 195, which in turn sends the communication request to the controller server 125. The caller identification services application 126 authorizes the communication via a message transmitted back to the parlay gateway 195 that authorizes the termination via the IMS 190. At the same time the call is being delivered, the caller identification services application 126 sends the caller id information to the IPTV Gateway 250, which searches caller identification database 127 for caller party identification information (e.g., caller name). The caller identification services application 126 searches the IPTV database 128 for the called party number, which may be used to map communications address information for devices, such as communications devices 106 (and set top box 110, etc.). An IPTV address mapped to the called party number is retrieved and the caller party identification information is transmitted over a data network (e.g., the IPTV infrastructure 200, etc.) to the IPTV-enabled communications device assigned to the IPTV address (e.g., the communications device 106).

Referring still, to FIG. 1A, the IPTV gateway is further in communication with an email server 160, which is in communication to a voicemail infrastructure 165 (e.g., Post Office Protocol version 3 (POP3)). It is appreciated that the voicemail infrastructure 165 can be any known voicemail system in communication with the PSTN 140, which manages voicemail left, for example, by a user of external call device 141 when a call is not answered by the subscriber call device 107. The voicemail infrastructure 165 is in communication with the email server 160 such that indications can be made to the IPTV gateway 250 when there is a voicemail, as described herein.

Figure 1B:
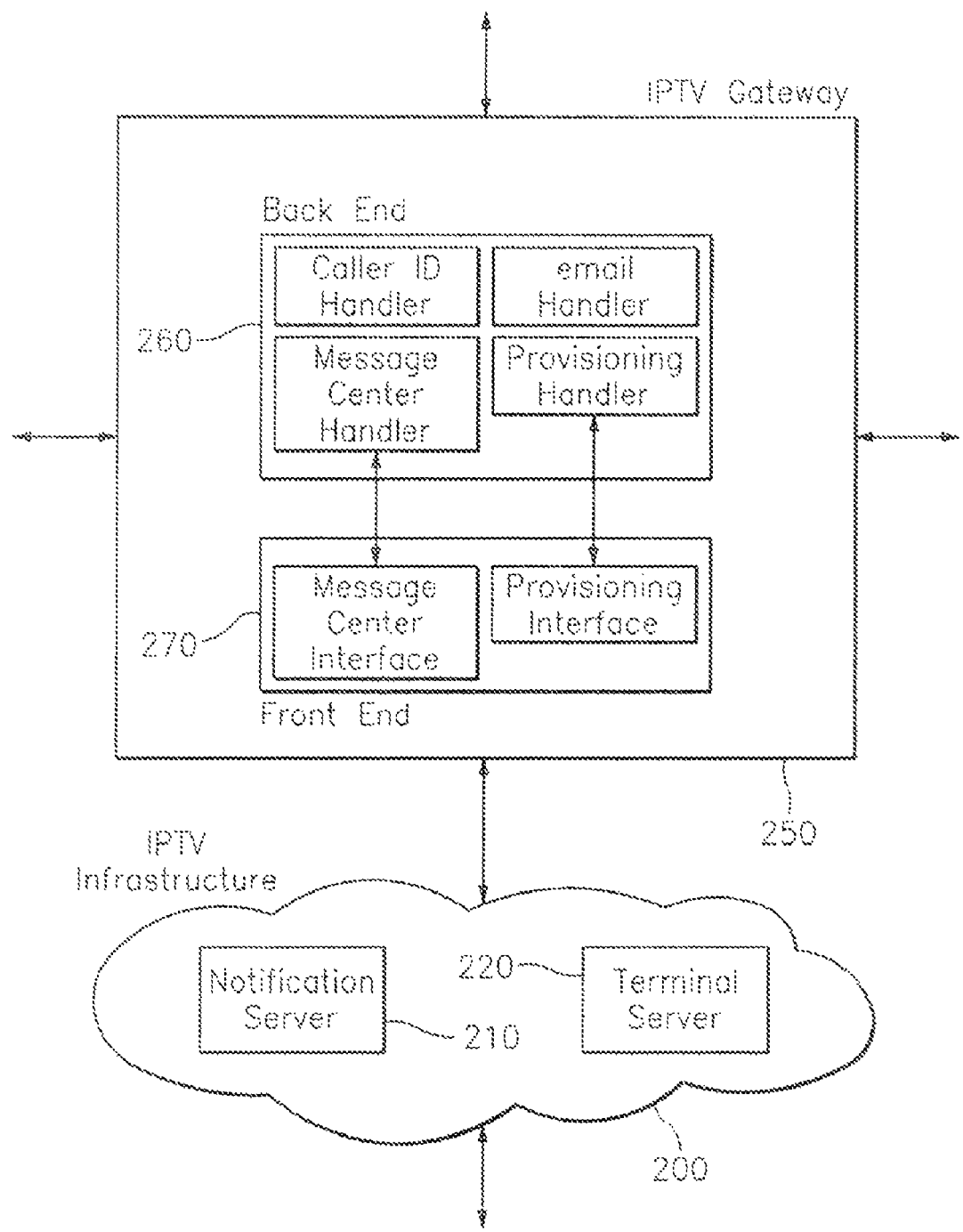
FIG. 1B illustrates a block diagram of an expanded view of an exemplary IPTV infrastructure and an exemplary IPTV gateway of FIG. 1.

FIG. 1B illustrates a block diagram of an expanded view of exemplary IPTV infrastructure 200 and an exemplary IPTV gateway 250 of FIG. 1. In exemplary embodiments, the IPTV infrastructure 200 provides an interface between the subscriber location and the IPTV gateway 250. The IPTV infrastructure 200 further handles account to set top box 110 mapping of messages and other information, as discussed further below. In exemplary implementations, a notification server 210 and a terminal server 220 operate to interface communication between the subscriber location 105 via the set top box 110, and the IPTV gateway 250. For example, in exemplary implementations, as discussed below, when the set top box 110 provides a unique identification number, a message is passed between the notification server 210 and the set top box 110.

The IPTV gateway 250 provides an interface between the controller server 125 and the IPTV infrastructure 200 and subscriber location 105. As discussed above and described in greater detail below, the IPTV gateway 250 handles notifications to the IPTV subscriber and further provides a history of the notifications. Furthermore, the IPTV gateway 250 handles account to telephone mapping as discussed further herein. In addition, the IPTV gateway 250 interfaces with the various system 100 elements as described herein. For example, the IPTV gateway is in communication with the voicemail infrastructure 165 to retrieve messages (e.g., EMAIL messages) regarding voicemail notifications. The IPTV gateway 250 is in further communication the service node 130 and media encoder 135 for voicemail encoding, for example. The IPTV gateway 250 is also in communication with the controller server 125 for handling caller identification information received from the PSTN 140, for example. In exemplary embodiments, the IPTV gateway 250 can include & back end 260 and a front end 270. The front end 270 can be used to implement various provisioning activities such as but not limited to initial provisioning of phone numbers and IPTV addresses. The back end 260, as described further herein, is implemented for many of the converged services. As such, the back end 260 can include various elements including hut not limited to a caller ID handler, email handler, message handler, provisioning handler, etc.

In exemplary embodiments, one of the devices, such as communications device 106 (and set top box 110 combination) can be used to establish account services, such as the converged services described herein. An account record may be generated for the subscriber at subscriber location 105, which identifies the subscriber and the account for which the services (e.g., basic account services as described above and converged services described herein). Account information and records may be stored in a storage device accessible by the IPTV gateway 250. In exemplary embodiments, the IPTV gateway 250 implements one or more applications for establishing and utilizing a converged services service account. A converged services service account may thus be created for a community of communications devices (e.g., communications device 106, subscriber call devices 107, 108, subscriber computer 109, etc.) to enable the communications devices to implement the converged services as described herein. A preferences server 211 (FIG. 1A) includes preferences information for the subscriber location 105 as described further herein.

In exemplary embodiments, the IPTV gateway 250 may implement authentication using a high-speed processing device (e.g., a computer system) that is capable of handling high volume activities conducted via communications devices, and other network entities (e.g., parts of the IPTV infrastructure 200, base station or cell tower 151, a public switched telephone network (PSTN) network 140, etc.) via one or more networks (e.g., an IPTV infrastructure 200, etc. as described herein). The IPTV gateway 250 receives requests from one or more devices from the subscriber location 105 either to establish a converged services service account or to access network services, such as the converged services. The IPTV gateway 250 may implement authentication software for restricting or controlling access to network. The IPTV gateway 250 may be in communication with a customer identity system (CIS) database, which stores subscriber credentials (e.g., subscriber names and passwords) established via the converged services account.

Figure 2:
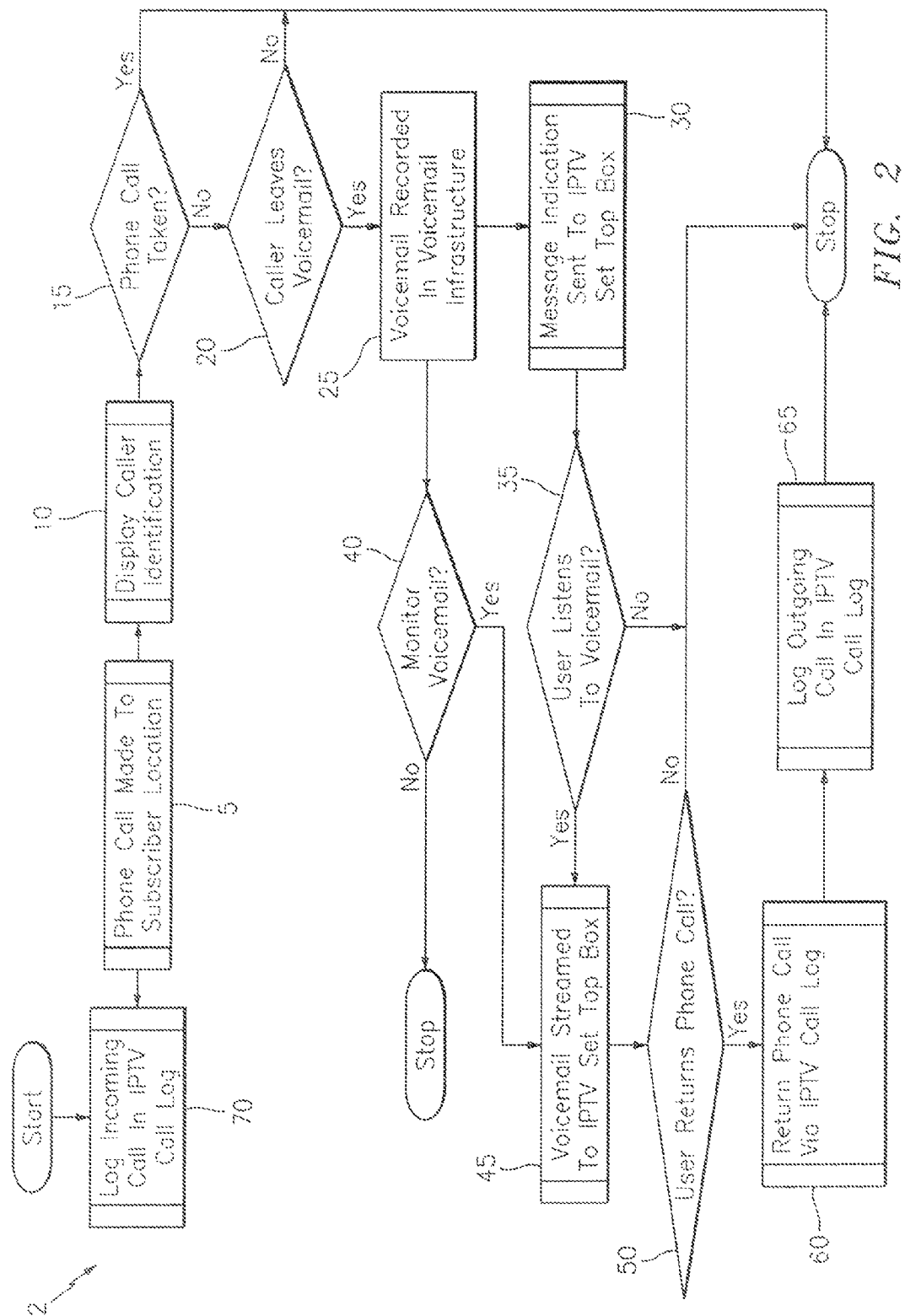
FIG. 2 illustrates an IPTV call management method in accordance with exemplary embodiments.

FIG. 2 illustrates an IPTV converged services method 2 in accordance with exemplary embodiments. The method 2 illustrates an overall exemplary IPTV converged services flow, with specific sub-flows discussed subsequently with respect to the figures described below.

In exemplary embodiments, an external user makes a phone call to the subscriber location 105 using external calling device 141 over a voice network such as PSTN 140 at step 5. A central office switch or SSP of the PSTN 140 receives the communication (e.g., communication signaling), resulting in a termination attempt trigger. The trigger causes a communication request to proceed over the SS7 network 145 via, e.g., a signal transfer point (STP). The communication request is received at the controller server 125. The communication request includes call-related information, e.g., called party number (e.g., a number assigned with subscriber call devices 107, 108) and caller party number associated with a communications device such as external call device 141. The caller SPA application 126 authorizes a communication session between the called party device and the caller party device via a return reply (e.g., termination authorization signal) over the signaling network (e.g., the SS7 network 145). At the same tune, the SCP 125 searches the caller identification database 127 for caller party identification information (e.g., caller name). The caller party identification information is retrieved from the database 127. The SCP 125 sends the caller id information to the IPTV gateway 250, which further searches IPTV database 128 for the called party number. The called party number may be used to map communications address information for devices, such as communications device 106. The IPTV gateway 250 further retrieves an IPTV address mapped to the called party number. The IPTV address may be a uniform resource locator (URL), Internet address, or other type of address. The caller party identification information is transmitted over a data network (e.g., IPTV infrastructure 200) via the IPTV gateway 250 to the IPTV-enabled communications device assigned to the IPTV address (e.g., communications device 106). As discussed further below, the caller party identification information may be transmitted to the set top box 110 of the IPTV-enabled communications device 106 using, e.g., UDP/HTTP protocols, where it is displayed or otherwise rendered on the IPTV device at step 210 (see FIG. 3A). In exemplary embodiments, the preferences server 211 may include information specifying which of several IPTV set top boxes have requested to receive caller information, and which have not, etc.

When the call is made at step 5, the incoming call is further logged in the IPTV call log ill at step 70. As discussed above, when the caller party identification information is transmitted over a data network (e.g., IPTV infrastructure 200) via the IPTV gateway 250 to the IPTV-enabled communications device assigned to the IPTV address (e.g., communications device 106), the party identification information is further logged into the call log 111 on the IPTV gateway 250. It is appreciated that the call log 111 may further reside on the set top box 110, the controller server 125, etc. As discussed former below, the caller party identification information may be transmitted to the set top box 110 of the IPTV-enabled communications device 106 using, e.g., UDP/HTTP protocols, where it is logged at step 70.

If the subscriber answers the phone call at step 15, the flow ends. It is appreciated that the display of the caller identification information on the communications device 106 allows the subscriber to know who is placing the phone call, and thus can make a decision to answer the phone or not. If the subscriber does not take the phone call at step 15, then the method 2 determines whether or not the caller leaves a voicemail. If the caller does not leave a voicemail at step 15, then the flow ends. If the caller does leave a voicemail at step 20, then the voicemail is recorded in the voicemail infrastructure 165 at step 25 in accordance with voicemail systems and methods known in the art. However, at step 30 in accordance with exemplary embodiments, the voicemail infrastructure 165 informs the email server 160 that a voicemail is left. The email server 160 then sends a message to the IPTV gateway 250, which sends an voicemail indication to the set top box 110 via the IPTV infrastructure 200 at step 30. In one exemplary implementation, the voicemail indication is a text message sent to the communications device 106 indicating that a voicemail is in the process of being left. In another exemplary implementation, another indication is a message indicating that a voicemail has been left. In the aforementioned exemplary implementations, the message can be displayed on the communications device 106, but does not persist. It is appreciated that such a non-persistent message can be desirable so that it does not interfere with the subscriber's viewing ability. However, in another exemplary implementation, a persistent message waiting indication can be displayed on the communications device. The persistent message can be in the form of an icon or other indicator on a portion of the communications device 106 display in an area away from a main viewing area.

At step 35, it is determined whether or not the subscriber listens to the voicemail, which can be from the call log 111, alter the voicemail has been left, etc. If the subscriber does not choose to listen to the voicemail at step 35, then the flow ends. If the subscriber chooses to monitor to the voicemail at step 30 when the subscriber receives an indication that the voicemail is in the process of being left, then the subscriber can monitor the voicemail at step 40 (see FIG. 4G). Regardless of how the subscriber listens to the voicemail, the voicemail is delivered to the media server 131 and ultimately to the subscriber location 105 for rendering on the communications device 106 at step 45. In exemplary embodiments, the voicemail can be left in the voicemail infrastructure 165 as a .wav file. The IPTV gateway 250 can coordinate the transfer of the voicemail file for translation to a .wma format in the media encoder 135. The media server 131 can then send the voicemail through the IPTV gateway 250 and the IPTV infrastructure 200 to the set top box 110 so that the subscriber can listen to the voicemail on the communications device 106.

Regardless of how the subscriber has handled the call, that is, by either not taking the call at step 15, listening to the voicemail or not listening to the voicemail at step 35, the call is logged into the call log 111 at step 70, as described above. The subscriber can use one of the subscriber call devices 107, 108 to return the phone call. In exemplary embodiments, the subscriber can also use the IPTV call log 111 to return the phone call. Therefore, at step 50, it the subscriber does not return the phone call, the flow ends. If the subscriber does return the phone call via the IPTV call log 111 at step 60, then the phone call is placed via the IPTV call log 111 at step 60 (see FIG. 6), and the call is logged as an outgoing call in the IPTV call log 111 at step 65. It is appreciated that the call is logged regardless of whether the call is made form the call log 111.

As discussed above, it is appreciated that the method 2 of FIG. 2 illustrates an overview of the IPTV converged services methods implemented in system 100 as described herein. Further details of exemplary caller identification services are now described.

Figure 3A:
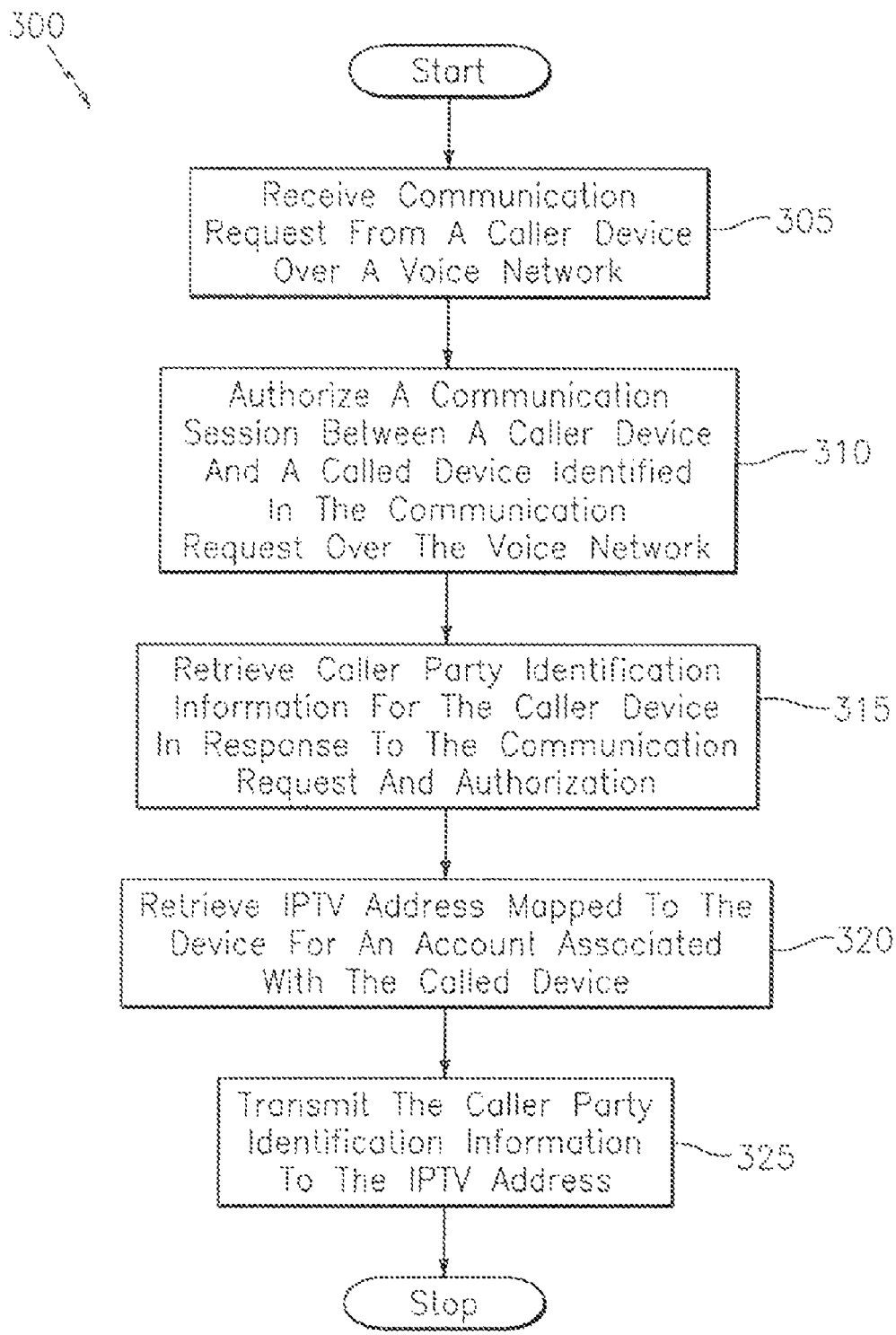
FIG. 3A illustrates an IPTV caller identification management method in accordance with exemplary embodiments.

FIG. 3A illustrates an IPTV caller identification management method 300 in accordance with exemplary embodiments. As discussed above, a communication is initiated by an external call device 141 over a voice network (e.g., PSTN 140). A central office switch or SSP of the PSTN 140 receives the communication (e.g., communication signaling), resulting in a termination attempt trigger. The trigger causes a communication request to proceed over the SS7 network 145 via e.g., a signal transfer point (STP). At step 305, the communication request is received at the controller server 125. The communication request includes call-related information, e.g., called party number (e.g., a number assigned with the subscribers call device 107, 108) and the caller party number. The SPA application 126 authorizes a communication session between the subscriber's call device 107 and the external call device 141 via a return reply (e.g., termination authorization signal) over the signaling network (e.g., the SS7 network 145) at step 310. At the same time, caller identification database 127 is searched for caller party identification information (e.g., caller name).

At step 315, the caller party identification information is retrieved from database 127. The SPA application 126 sends the caller id information to the IPTV Gateway 250, which searches IPTV database 128 for the called party number. The called party number may be used to map communications address information for devices, such as the subscriber's call devices 107, 108 and communications device 106. An IPTV address mapped to the called party number is retrieved at step 320. The IPTV address may be a uniform resource locator (URL), Internet address, or other type of address. At step 325, the caller party identification information is transmitted over the IPTV gateway 250 and the IPTV infrastructure 200 to the IPTV-enabled communications device assigned to the IPTV address (e.g., communications device 106). In an exemplary implementation, TCP communication can be exchanged between the IPTV infrastructure 200 and the IPTV gateway in order to coordinate transfer of the set top box 110 identification, set top preferences for display on the communications device 106 and exchange of caller ID information, for example. The caller party identification information may be transmitted to the set top box 110 of the IPTV-enabled communications device 106 using, e.g., UDP/HTTP protocols, where it is displayed or otherwise rendered on the IPTV device (e.g., the communications device 106). It is understood that the IPTV database 128 may include information specifying which of several IPTV set top boxes have requested to receive caller information, and which have not. The caller identification services described above may be modified or adapted to varying communication networks. It is further appreciated that the methods described herein provide an identification message and corresponding message indication whether the subscriber is receiving a call via call waiting, for example.

Figure 3B:
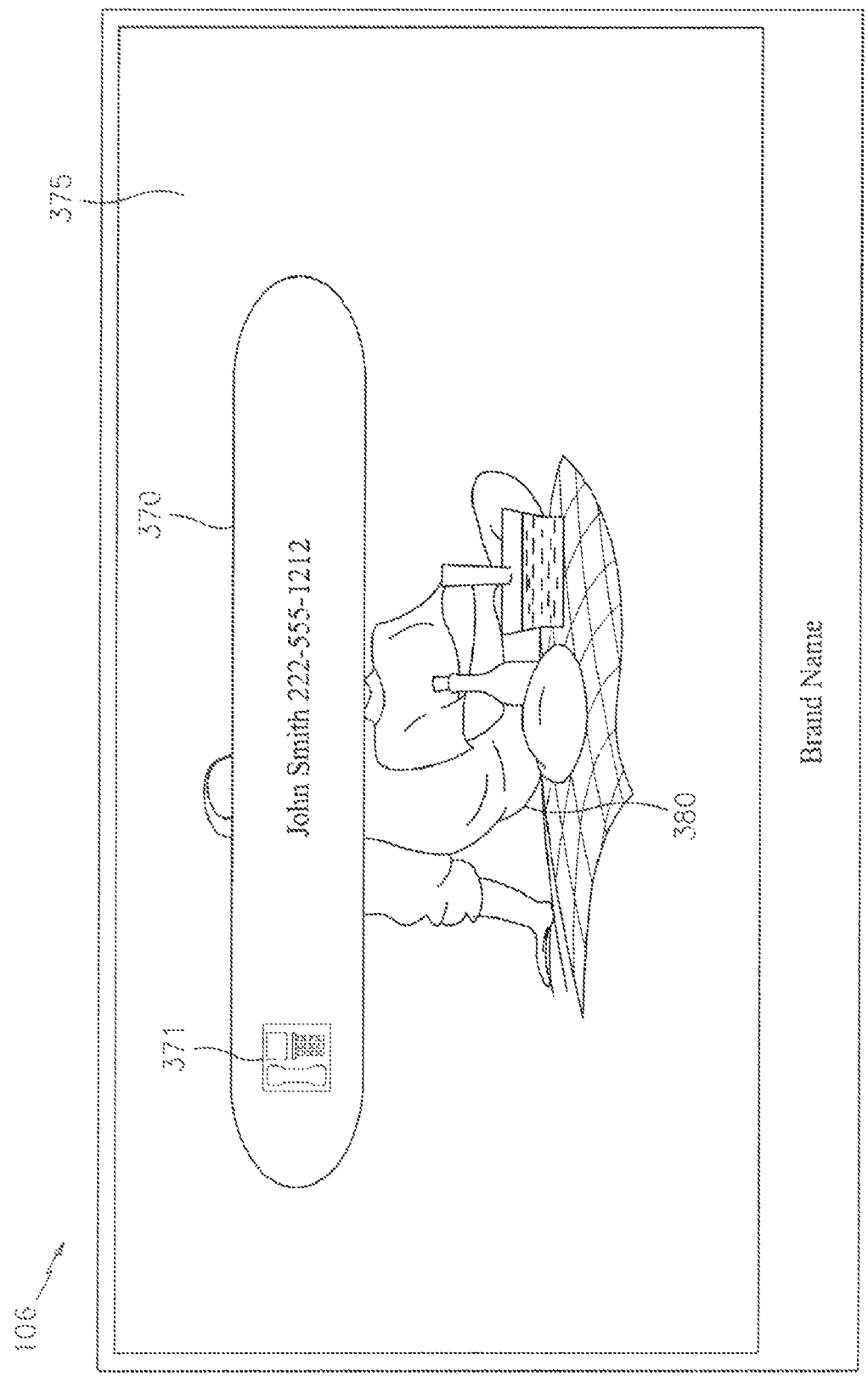
FIG. 3B illustrates an exemplary communications device displaying a caller identification message indication in accordance with exemplary embodiments.

FIG. 3B illustrates an exemplary communications device 106 displaying a caller identification message indication 370 in accordance with exemplary embodiments. It is now appreciated that when a subscriber receives a phone call as described above, the subscriber's call device 107 rings as described. In addition, the message is sent to the communications device 106 (e.g., an IPTV enabled television having a screen 375) and the message indication 370 is displayed on the screen, which can occur over the normal programming content 380. In other exemplary embodiments, the message indication 370 can be displayed in other areas of the screen 375. As discussed above, in exemplary embodiments, the message indication 370 can be displayed for a short period of time and then be removed from the screen 375. In other exemplary embodiments, the caller identification message indication 370 can include an icon 371 representing a phone call. As illustrated, a default icon 371 can be displayed, which is illustrated as a telephone. However, the icon can be a unique representation related to the caller including, but not limited to, a picture, a video clip, a text clip, a customized icon, etc. The representation icon 371 can be stored locally such as on the subscriber's set top box 110, or alternatively, the representation can be linked to the caller identification information stored in die caller identification database 127. In other exemplary embodiments, the icon 371 could be linked to an audio file that is unique to the caller such as a voice announcing the caller's name, which can be local to the subscriber location 105, such as residing on the set top box 110. Alternatively, the audio file could be coupled to the caller identification information stored in the caller identification database 127. In an exemplary implementation, the above-described audio file can be recorded by the caller in the same way that a caller announces a name and greeting when setting up a voicemail account, for example. The delivery of the representation to the subscriber's set top box 110 can be implemented in the same way that the caller identification information is delivered as described herein. The addition of video and audio is implemented as voicemail is delivered using the service node 130 as described below with respect to delivery of voicemail. In exemplary embodiments, the audio file can be in a .wav format. The IPTV gateway 250 can access the media server 131 and the media encoder 135 in order to initiate an encoding session. In one exemplary implementation, the .wav voicemail file can be encoded into .wma format for streaming to the set top box 110. In turn, the media server 131 can store the encoded .wma file to stream to the set top box 110 with the caller identification indication. The IPTV gateway 250 can then request and obtains the encoded file. The IPTV gateway 250 communicates with the IPTV infrastructure 200 to obtain the set top box ID and preferences. In an exemplary implementation, TCP communication can be exchanged between the IPTV infrastructure 200 and the IPTV gateway 250 in order to coordinate transfer of the set top box 110 identification, the set top box 110 preferences for display on the communications device 106 and exchange of caller identification indication, for example. The caller identification indication may be transmitted to the set top box 110 of the IPTV-enabled communications device 106 using, e.g., UDP/HTTP protocols, where it is displayed or otherwise rendered on the IPTV device. Then, the encoded audio file is streamed to the set top box 110 from the service node 130, via the IPTV gateway 250 and the IPTV infrastructure 200 for playback on the communications device 106.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing caller identification services to a set top box, comprising:
   receiving a communication request from a caller device of a caller over a voice network, the communication request including a caller party number of the caller device and a called party number of a dual-mode called device associated with the communication request;
   mapping the called party number to an internet protocol device address associated with a called party; and
   sending the caller party number to the internet protocol device address associated with the called party number;
   wherein an internet protocol television gateway, in communication with a preferences server, is configured to determine which of a plurality of set top boxes have requested to receive caller party information of the caller and which have not requested to receive the caller party information of the caller.

2. The method of claim 1, further comprising:
   receiving a termination attempt message from an internet protocol multimedia subsystem when the dual mode device is in a non-cellular mode; and
   receiving a customized applications for mobile network enhanced logic termination attempt trigger when the dual mode called device is in a cellular mode.

3. The method of claim 2, further comprising:
   returning a termination authorization to the internet protocol multimedia subsystem, when the dual mode phone is in the non-cellular mode, the termination authorization operable for causing a called party communication device associated with the called party number to ring prior to sending the caller party number to the internet protocol device address; and
   returning a customized applications for mobile network enhanced logic continue message, when the dual mode phone is in the cellular mode, the termination authorization causing the called party communication device associated with the called party number to ring prior to sending the caller party number to the internet protocol device address.

4. The method of claim 3, wherein the customized applications for mobile network enhanced logic termination attempt trigger and the termination authorization is routed via a parlay gateway configured to transmit messages when the dual mode phone is in the non-cellular mode, and wherein the communication request includes administrative information from a mobile switching center that has exchanged authentication, registration and location information with a home location register, when the dual mode phone is in the cellular mode.

5. The method of claim 1, wherein the internet protocol device address includes
   an internet address.

6. The method of claim 1, wherein the internet protocol device address corresponds to the set top box of the called party.

7. The method of claim 1, further comprising:
   identifying a caller party name assigned to the caller party number; and
   sending the caller party number and the caller party name to the internet protocol device address associated with the called party number.

8. A system for providing caller identification services to a set top box, comprising:
   a computer processing device; and
   a caller identification services application executing on the computer processing device, the caller identification services application performing a method, comprising:
   receiving a communication request from a caller device of a caller over a voice network, the communication request including a caller party number of the caller device and a called party number of a dual-mode called device associated with the communication request;
   mapping the called party number to an internet protocol device address associated with a called party; and
   sending the caller party number to the internet protocol device address associated with the called party number;
   wherein the computer processing device, in communication with a preferences server, is configured to determine which of a plurality of set top boxes have requested to receive caller party information of the caller and which have not requested to receive the caller party information of the caller.

9. The system of claim 8, wherein the caller identification services application further coordinates receiving a termination attempt message from an internet protocol multimedia subsystem when the dual mode called device is in a non-cellular mode and receiving a customized applications for mobile network enhanced logic termination attempt trigger when the dual mode phone called device is in a cellular mode.

10. The system of claim 9, wherein the caller identification services application returns a termination authorization to the internet protocol multimedia subsystem, when the dual mode phone is in the non-cellular mode, the termination authorization operable for causing a called party communication device associated with the called party number to ring prior to sending the caller party number to the internet protocol device address and returns a customized applications for mobile network enhanced logic continue message, when the dual mode phone is in the cellular mode, the termination authorization causing the called party communication device associated with the called party number to ring prior to sending the caller party number to the internet protocol device address.

11. The system of claim 10, wherein the customized applications for mobile network enhanced logic termination attempt trigger and the termination authorization is routed via a parlay gateway configured to transmit messages when the dual mode phone is in the non-cellular mode, and wherein the communication request includes administrative information from a mobile switching center that has exchanged authentication, registration and location information with a home location register, when the dual mode phone is in the cellular mode.

12. The system of claim 8, wherein the internet protocol device address includes
a uniform resource locator.

13. The system of claim 8, wherein the internet protocol device address corresponds to the set top box.

14. The system of claim 8, wherein the caller identification services application further performs:
identifying a caller party name assigned to the caller party number; and
sending the caller party number and the caller party name to the internet protocol device address associated with the called party number.

15. A computer program product for providing caller identification services to device set top box, the computer program product including instructions embodied on a non-transitory computer readable medium for causing a computer to implement a method, the method comprising:
receiving a communication request from a caller device of a caller over a voice network, the communication request including a caller party number of the caller device and a called party number of a dual-mode called device associated with the communication request;
mapping the called party number to an internet protocol device address associated with a called party; and
sending the caller party number to the internet protocol device address associated with the called party number;
wherein an internet protocol television gateway, in communication with a preferences server, is configured to determine which of a plurality of set top boxes have requested to receive caller party information of the caller and which have not requested to receive the caller party information of the caller.

16. The computer program product of claim 15, the method further comprising:
receiving a termination attempt message from an internet protocol multimedia subsystem when the dual mode called device is in a non-cellular mode; and
receiving a customized applications for mobile network enhanced logic termination attempt trigger when the dual mode called device is in a cellular mode.

17. The computer program product of claim 15, the method further comprising returning a termination authorization to the internet protocol multimedia subsystem, when the dual mode phone is in the non-cellular mode, the termination authorization operable for causing a called party communication device associated with the called party number to ring prior to sending the caller party number to the internet protocol device address and returning a customized applications for mobile network enhanced logic continue message, when the dual mode phone is in the cellular mode, the termination authorization causing the called party communication device associated with the called party number to ring prior to sending the caller party number to the internet protocol device address.

18. The computer program product of claim 17, wherein the customized applications for mobile network enhanced logic termination attempt trigger and the termination authorization is routed via a parlay gateway configured to transmit messages when the dual mode phone is in the non-cellular mode, and wherein the communication request includes administrative information from a mobile switching center that has exchanged authentication, registration and location information with a home location register, when the dual mode phone is in the cellular mode.

19. The computer program product of claim 15, wherein the internet protocol device address includes
an internet address.

20. The computer program product of claim 15, wherein the internet protocol device address corresponds to the set top box, the method further comprising:
identifying a caller party name assigned to the caller party number; and
sending the caller party number and the caller party name to the internet protocol device address associated with the called party number.

* * * * *